US007543190B2

(12) United States Patent
Walker

(10) Patent No.: US 7,543,190 B2
(45) Date of Patent: Jun. 2, 2009

(54) SYSTEM AND METHOD FOR DETECTING FALSE POSITIVE INFORMATION HANDLING SYSTEM DEVICE CONNECTION ERRORS

(76) Inventor: Don H. Walker, 2514 Planters House La., Katy, TX (US) 77449

( * ) Notice: Subject to any disclaimer, the term of this patent is extended or adjusted under 35 U.S.C. 154(b) by 423 days.

(21) Appl. No.: 11/426,960

(22) Filed: Jun. 28, 2006

(65) Prior Publication Data

US 2008/0005620 A1    Jan. 3, 2008

(51) Int. Cl.
   *G06F 11/00* (2006.01)
(52) U.S. Cl. .......................................... 714/43; 714/44
(58) Field of Classification Search ...................... None
   See application file for complete search history.

(56) References Cited

U.S. PATENT DOCUMENTS

2002/0194548 A1* 12/2002 Tetreault ...................... 714/43
2004/0003327 A1* 1/2004 Joshi et al. ................... 714/47
2005/0204197 A1   9/2005 Uddenberg et al. ........... 714/33
2006/0074583 A1   4/2006 Bieker et al. ................ 702/117

* cited by examiner

*Primary Examiner*—Michael C Maskulinski
(74) *Attorney, Agent, or Firm*—Robert W. Holland; Hamilton & Terrile, LLP

(57) ABSTRACT

False positive error warnings associated with hot insertion or removal of a device with an SAS link are filtered by comparing the timing of error warnings with the timing of hot insertion or removal of the device. An SCSI Enclosure Processor monitors physical device presence events through a side band bus, such as an I2C bus interfaced with physical devices. Upon detection of an error associated with the SAS link, an error filter module retrieves time stamped physical device presence events from the SCSI Enclosure Processor, compares the time stamp of the physical device presence event and suppresses the warning if the time stamp falls within a predetermined time of the error.

19 Claims, 2 Drawing Sheets

SYSTEM AND METHOD FOR DETECTING FALSE POSITIVE INFORMATION HANDLING SYSTEM DEVICE CONNECTION ERRORS

BACKGROUND OF THE INVENTION

1. Field of the Invention

The present invention relates in general to the field of information handling system device connections, and more particularly to a system and method for detecting false positive information handling system device connection errors.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically incorporate or interface with a variety of storage devices, such as hard disk drives, tape drives, or optical drives. Storage devices are typically built into the chassis of the information handling system so that, like other internal components, the storage devices receive power from the information handling system power subsystem and communicate information over internal buses. Alternatively, storage devices run as external separate systems that connect to the chassis of the information handling systems through physical connection. For example, one or more storage devices are sometimes configured as JBODs or RAID systems that provide enhanced storage for an information handling system server, such as a server configured to support a storage area network (SAN). To simplify the connection of storage devices, industry developed standard communication protocols for storage devices to use. A widely accepted storage device protocol is the SCSI protocol. Recently, in order to improve the speed at which storage devices communicate information, industry has developed a serial link protocol for supporting storage device communication know as the Serial Attached SCSI (SAS) protocol. The SAS protocol provides the more rapid information transfer rates available with a serial link while continuing to use the commands defined by the SCSI protocol. In addition, the SAS protocol supports the hot insertion and removal of a storage device to an information handling system. A wide variety of devices may support the SAS protocol with hot insertion and removal for plug and play communication of information to an information handling system, such as facsimile devices, scanners and copiers.

Typically, information handling systems monitor SAS device connections for errors in the information communicated with SAS devices. For instance, an SAS Phy Error Log Counter tracks errors across an SAS connection as the errors occur to predict a failing device connection. For example, the rate-of-change of the SAS PHY Error Log Counters are monitored in an SAS environment to detect failing connections in the SAS Service Delivery Subsystem, target devices and other components of an SAS solution set. Thus, an increased rate-of-change of detected errors above a predetermined threshold triggers an error warning to the end user or to information technology administrators who are monitoring the equipment. However, hot insertion and removal of target devices in an SAS environment sometimes causes the Phy Error Log Counters to increase dramatically over a short period of time as an active device connects or disconnects with the SAS link. Generally, the normal insertion and removal of an SAS device is not distinguishable from a failed or failing device or connection using existing SAS protocol methods, such as BROADCAST(CHANGE) SAS primitives. Generation of false positive SAS link failure warnings causes end user confusion and unnecessary maintenance, such as end user calls for technical help to the manufacturer of the information handling system or SAS device.

SUMMARY OF THE INVENTION

Therefore a need has arisen for a system and method which monitors errors at a link with respect to the connection or disconnection of a device at the link to avoid false positive error warnings associated with connection or disconnection of the device at the link.

In accordance with the present invention, a system and method are provided which substantially reduce the disadvantages and problems associated with previous methods and systems for monitoring an information handling system link to avoid false positive error warnings associated with connection or disconnection of a device at the link. Error events associated with a link are compared with physical device presence events to confirm or refute the error event. Sufficient temporal correspondence between a physical device presence event and an error event results in filtering out the error event while insufficient temporal correspondence results in issuance of an error warning.

More specifically, a host information handling system interfaces with one or more physical devices through an SAS link. A link end device monitoring subsystem, such as an SCSI Enclosure Processor (SEP), monitors the physical device operating environment through an out of band management bus, such as an I2C bus. An SAS link controller monitors link traffic between the host information handling system and physical devices interfaced with the SAS link to detect and track errors that occur in the communication of information across the link, such as with a link error log counter. The SAS controller determines an error event if the number of errors at the SAS link reach a predetermined level, such as by tracking the rate-of-change in detected errors over time and issuing an error event if a predetermined number or errors occur or are predicted to occur in a given time period. An error filter module monitors error events to filter out false positive error warnings. The error filter module retrieves time stamped physical device presence events from the SEP and compares the timing of physical device presence events, such as hot insertion or removal of a device, with events for temporal correspondence. Sufficient temporal correspondence between an error event and a physical device presence event filters out the error event while insufficient temporal correspondence results in issuance of an error warning for the error event.

The present invention provides a number of important technical advantages. One example of an important technical advantage is that errors associated with hot insertion or removal of a device at a link are filtered to avoid false positive link error messages. Avoiding false positive link error failure warnings reduces end user confusion and troubleshooting where no failure exists. Thus, end users are less likely to call for technical assistance that would otherwise unnecessarily increase the costs of the information handling system or device manufacturer. End users are more satisfied and have a more positive customer experience where the system operates correctly without generating false positive link failure warnings.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Filtering error warnings associated with an information handling system physical and electrical interconnect, such as an SAS link, to account for errors generated by hot insertion or removal of a device avoids issuance of false positive error warnings at the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
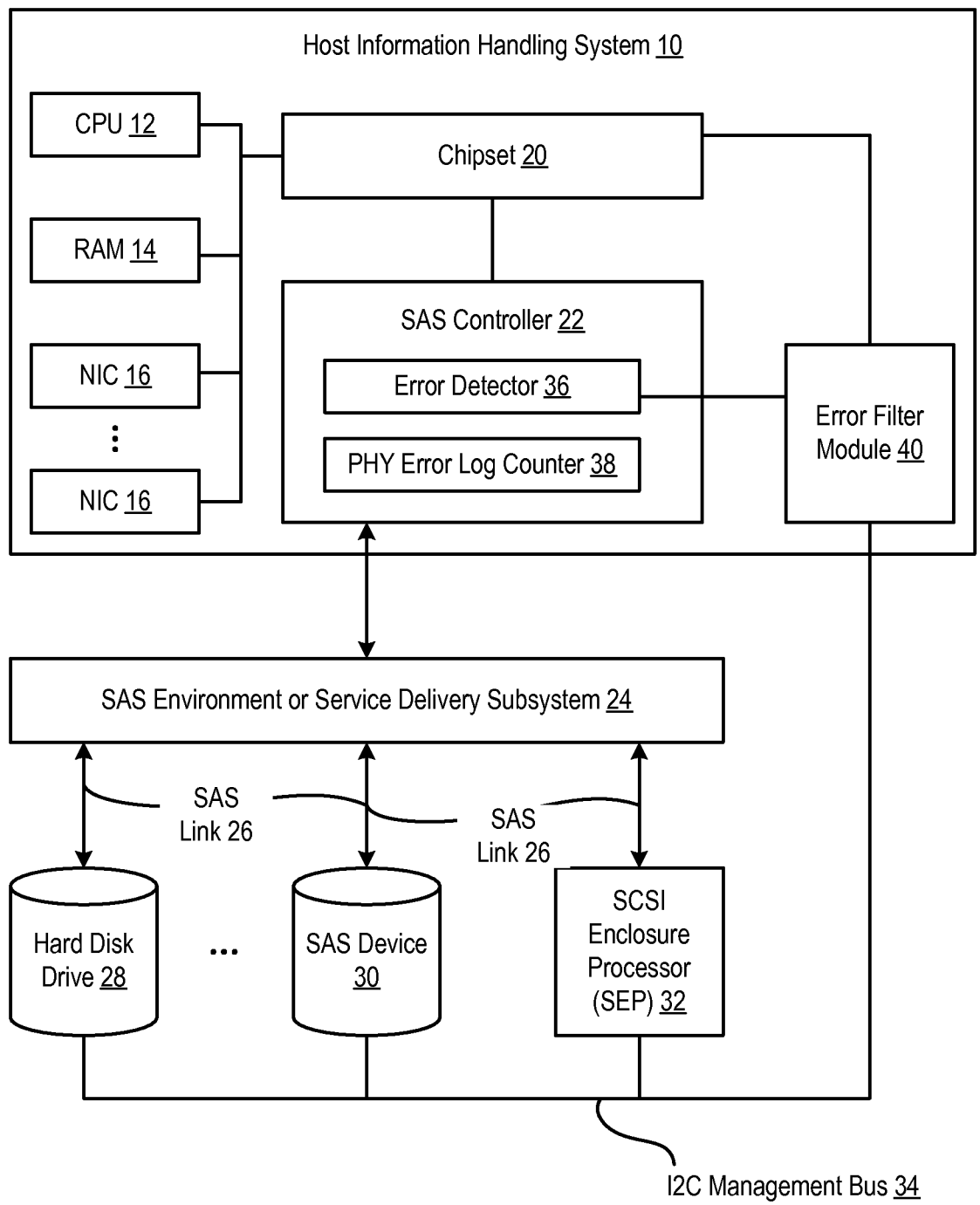
FIG. 1 depicts a block diagram of an information handling system that filters errors detected at an SAS link to avoid false positive error warnings due to hot insertion or removal of a device.

Referring now to FIG. 1, a block diagram depicts an information handling system 10 that filters errors detected at an SAS link to avoid false positive error warnings due to hot insertion or removal of a device. Information handling system 10 has plural processing components to process information, such as a CPU 12, RAM 14, plural network interface cards (NICs) 16 and a chipset 20. Chipset 20 interfaces with a network controller, such as an SAS controller 22 in an HBA or ROC, to support network controller interaction with CPU 12. SAS controller 22 provides an interface for the processing components to interact with SAS devices through an SAS Environment or Service Delivery Subsystem 24 that supports an SAS link 26. Devices supported by SAS link 26 include hard disk drives 28 or other types of SAS devices 30, such as tape drives, optical drives, scanners, facsimile devices, etc. . . . . A link end device monitoring subsystem 32, such as an SCSI Enclosure Processor (SEP), monitors the primary SAS link and end device environment by communicating with devices 28 and 30 through an out of band management bus 34, such as an I2C bus. The SAS environment 24 including bus 26, devices 28 and 30, SEP 32 and I2C bus 34, may be integrated within information handling system 10 or distributed.

In operation, SAS controller 22 manages communication of information between processing components of information handling system 10 and SAS devices 28 or 30 through SAS link 26. SAS controller 22 also communicates through SAS link 26 with SEP 32 to monitor environmental information gathered through I2C management bus 34. An error detector 36 monitors traffic through SAS link 26 to detect errors that occur and tracks the errors in a physical error log counter 38. Error detector 36 generates warnings of link failure or impending link failing by tracking the rate-of-change of errors in physical error log counter 38 over time, such as failing connections in SAS delivery subsystem 24, target devices 28 or 30, or other components of the SAS solution set. The issuance of visual warnings by error detector 36 if the values in log counter 38 exceed or are about to exceed a predetermined level of errors allow end user corrective action. However, hot insertion or removal of a device at SAS link 26 generates errors which error detector 36 incorrectly perceives as a failed or failing connection resulting in issuance of a false positive error warning.

In order to avoid issuance of false positive error warnings, an error filter module 40 monitors error warnings generated by error detector 36 and filters those error warnings to account for errors generated by hot insertion or removal of a physical device at SAS link 26. If error detector 36 issues an error warning, error filter module 40 confirms or refutes the error warning determination and filters out issuance of false positive error warnings, such as error warnings generated by hot insertion or removal of a device at SAS link 26. For example, error filter module 40 queries SEP 32 for time stamped information about physical device presence events and compares the time of the physical device presence events with the time of the error warning generation. If a physical device presence event correlates sufficiently with generation of an error warning, such as within a predetermined time period, then error filter module 40 suppresses issuance of the error warning. If insufficient temporal correspondence is found between the issuance of an error warning and a physical device presence event, such as a hot insertion or removal, then error filter module 40 allows issuance of the warning at information handling system 10. Although FIG. 1 depicts a SEP 32 as providing physical device environmental monitoring for presence events, in alternative embodiments other types of hardware, firmware or software can monitor the environment of physical devices through an out of band bus to provide environmental information to error filter module 40.

Figure 2:
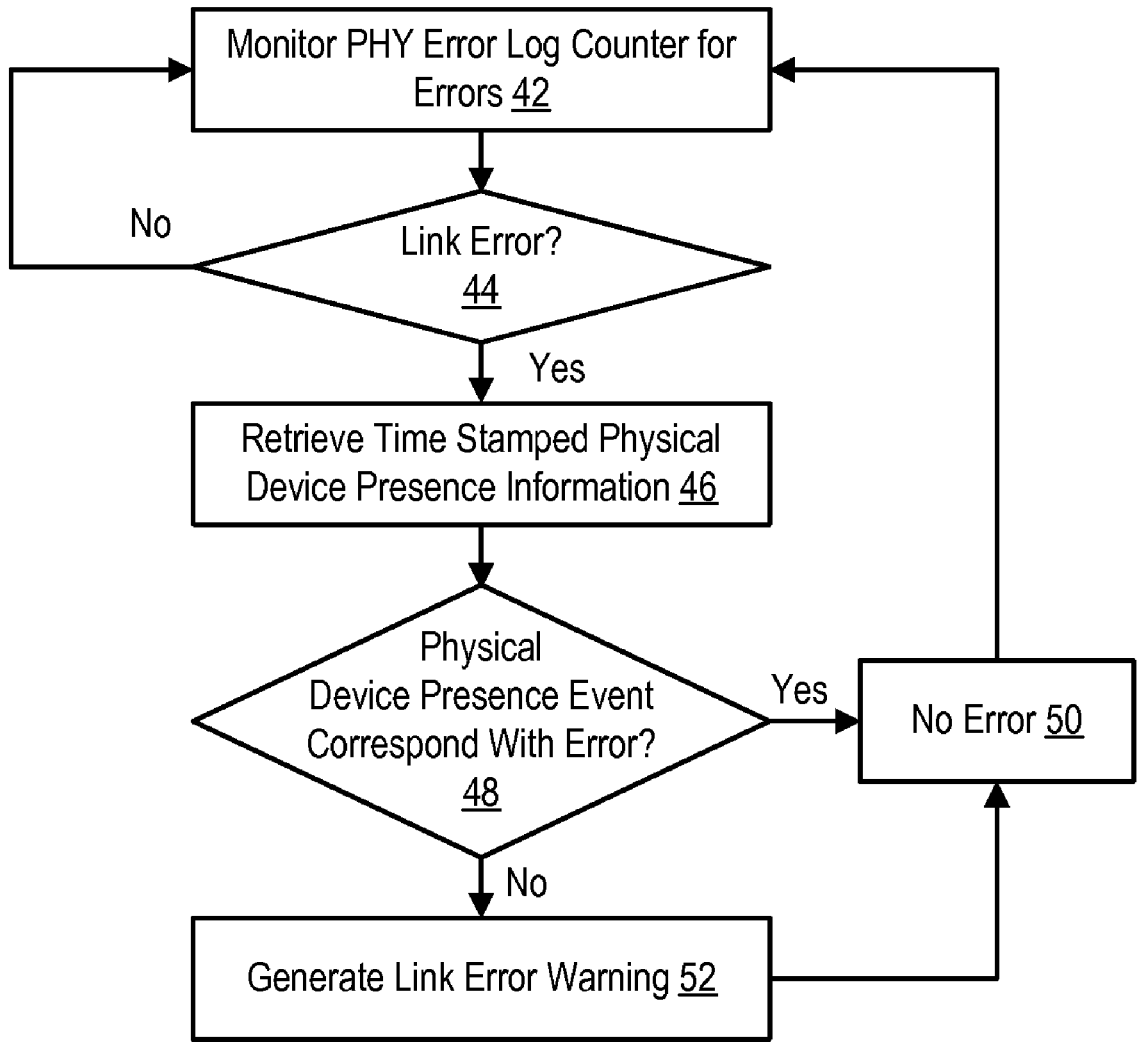
FIG. 2 depicts a flow diagram of a process for filtering link error warnings to avoid false positive error warnings due to hot insertion or removal of a device.

Referring now to FIG. 2, a flow diagram depicts a process for filtering link error warnings to avoid false positive error warnings due to hot insertion or removal of a device. The process begins at step 42 with the monitoring of the physical error log counter for errors. At step 44, if an error is not detected then the process returns to step 42 to continue monitoring for errors. If at step 44 an error is detected, the process continues to step 46 to confirm or refute the error. At step 46, time stamped physical device presence information is retrieved from the link end device monitoring subsystem. At step 48 the physical device presence event information is analyzed to determine if a physical device presence event occurred within a predetermined time of a detected error event. If sufficient temporal correspondence exists between the physical device presence event and the error event, the process continues to step 50 to refute the error event, the refuted error event is filtered out from issuance as a false positive event, and the process returns to step 42. If at step 48 insufficient temporal correspondence exists between a physical device presence event and an error event, the process continues to step 52 to generate a link error warning and then returns to step 42 to continue the monitoring of the physical error log counter for additional errors.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   an SAS link controller interfaced with the processing components and operable to communicate information between the processing components and an SAS link;
   an SAS link interfaced with the SAS link controller, the SAS link operable to communicate information between the SAS link controller and one or more devices interfaced with the SAS link;
   an SCSI enclosure processor interfaced with the SAS link and a management bus, the SCSI enclosure processor operable to communicate with the one or more devices through the management bus to monitor the status of the devices;
   a error detector interfaced with the SAS link and operable to determine if errors associated with communication of information through the SAS link exceed a predetermined error threshold; and
   an error filter module interfaced with the error detector and the SCSI enclosure processor, the error filter module operable to filter errors determined by the error detector if a predetermined status is detected for a device by the SCSI enclosure processor.

2. The information handling system of claim 1 wherein the error filter module filters errors by:
   retrieving time stamped physical device presence information from the SCSI enclosure processor;
   comparing the time of a physical device presence event with the time of the error; and
   filtering out the error if the physical device presence event is within a predetermined time period of the error.

3. The information handling system of claim 2 wherein the error filter module filters errors further by:
   allowing the error to issue if the physical device presence event is greater than the predetermined time period.

4. The information handling system of claim 2 wherein the physical device presence event comprises a hot insertion of a device to the SAS link.

5. The information handling system of claim 2 wherein the physical device presence event comprises a hot removal of a device from the SAS link.

6. The information handling system of claim 1 wherein the management bus comprises an I2C bus.

7. The information handling system of claim 1 wherein the device comprises a hard disk drive.

8. The information handling system of claim 1 wherein the device comprises a tape drive.

9. The information handling system of claim 1 wherein the device comprises an optical drive.

10. A method for filtering errors associated with a link, the method comprising:
    communicating information across a link;
    detecting a predetermined link error threshold of errors associated with the communicating of information across the link;
    determining if a physical device presence event occurred within a predetermined time of the detecting a predetermined link error threshold of errors; and
    filtering the predetermined link error threshold of errors if the physical device presence event occurred within the predetermined time.

11. The method of claim 10 further comprising:
    issuing an error message if a physical device presence event did not occur within the predetermined time.

12. The method of claim 10 wherein the determining if a physical device presence event occurred within a predetermined time of the detecting a predetermined link error threshold of errors further comprises:
    retrieving time stamped physical device presence information from a side band link end device monitoring subsystem;
    comparing the time of a physical device presence event with a time of the error.

13. The method of claim 12 wherein the link comprises an SAS link and the side band link end device monitoring subsystem comprises an SCSI Enclosure Processor that interfaces with physical devices through a side band bus.

14. The method of claim 13 wherein the side band bus comprises an I2C bus.

15. The method of claim 12 wherein communicating information further comprises communicating information with a storage device.

16. A system for managing communication across an SAS link with one or more devices, the system comprising:
    an error detector operable to detect errors in communication of information across the SAS link and to issue error warnings if the detected errors exceed a predetermined threshold;
    a link end device monitoring subsystem interfaced with the SAS link and interfaced with the one or more devices through a side band bus, the link end device monitoring subsystem operable to determine device presence events associated with the devices; and
    an error filter module interfaced with the error detector and the link end device monitoring subsystem, the error filter module operable to filter an error warning if the error warning occurs within a predetermined time of a device presence event.

17. The system of claim 16 wherein the link end device monitoring subsystem comprise an SCSI Enclosure Processor.

18. The system of claim 17 wherein the side band bus comprises an I2C bus.

19. The system of claim 16 wherein the device presence events comprise a hot insertion of a device to the SAS link.

* * * * *